United States Patent

[11] 3,608,038

[72] Inventor Frank R. Smith
 3461 Lansdowne Drive, Lexington, Ky. 40502
[21] Appl. No. 12,671
[22] Filed Feb. 19, 1970
[23] Division of Ser. No. 842,806, July 7, 1969, which is a continuation of Ser. No. 711,147, Feb. 16, 1968, abandoned, which is a continuation-in-part of Ser. No. 455,831, May 14, 1965, abandoned.
[45] Patented Sept. 21, 1971

[54] METHOD OF MAKING A PRECAST DECORATIVE PANEL
 22 Claims, 9 Drawing Figs.
[52] U.S. Cl. ................................................. 264/162, 264/256, 264/257, 264/273, 264/275
[51] Int. Cl. ................................................. B29d 3/02
[50] Field of Search ..................................... 264/162, 247, 255, 273, 275, 246, 256

[56] References Cited
UNITED STATES PATENTS
| | | | |
|---|---|---|---|
| 1,169,985 | 2/1916 | Mickelson | 264/255 |
| 3,091,176 | 5/1963 | Wall | 264/273 X |
| 3,097,080 | 7/1963 | Weir | 264/255 UX |
| 3,232,017 | 2/1966 | Prusinski et al. | 264/247 X |
| 3,324,213 | 6/1967 | Anfinset | 264/255 X |
| 3,328,500 | 6/1967 | Barnette | 264/275 X |

Primary Examiner—Robert F. White
Assistant Examiner—Allen M. Sokal
Attorney—Frank C. Leach, Jr.

ABSTRACT: A precast decorative panel is formed by filling a flexible mold to a selected level with an unset thermosetting resin and aggregates. After a nonrigid member, which is smaller than the receptacle, is placed on top of the mixture of resin and aggregates, a filler mold, which is smaller than the receptacle and substantially the same configuration so as to form a substantially uniform space therebetween, is disposed within the receptacle. This uniform space is filled with aggregates and an unset thermosetting resin. After the unset resin is partially cured to a soft gel, the filler mold is removed. Then, the partially cured resin is separated from the mold. This produces a panel having a textured top surface and a bottom surface with a drop edge extending therefrom along the entire periphery of the body of the panel.

INVENTOR
FRANK R. SMITH

BY Frank C. Leach jr.

ATTORNEY

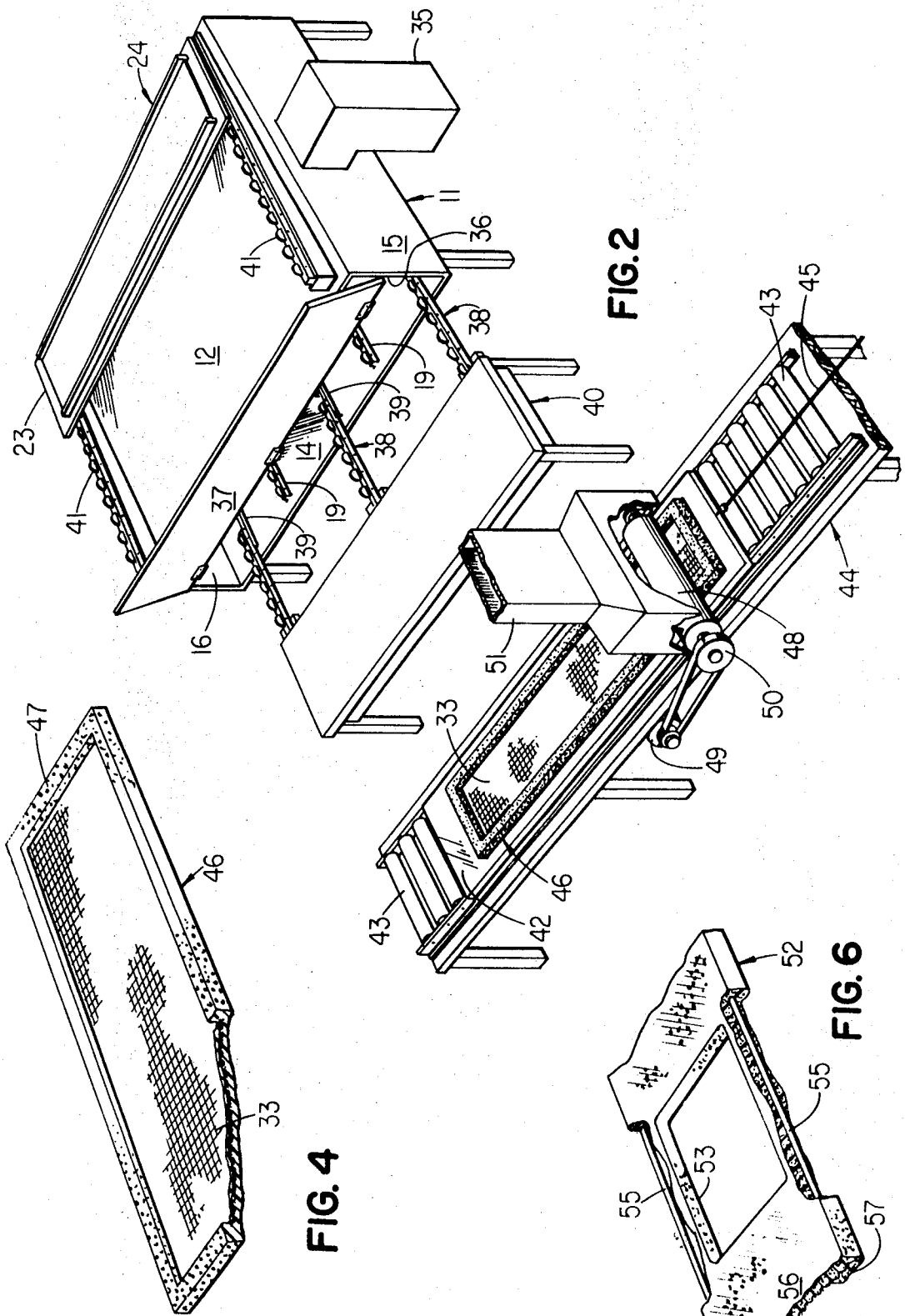

METHOD OF MAKING A PRECAST DECORATIVE PANEL

This is a division of application Ser. No. 842,806, filed July 7, 1969, which is a continuation of application Ser. No. 711,147, filed Feb. 16, 1968, and now abandoned, which is a continuation-in-part of application Ser. No. 455,831, filed May 14, 1965, and now abandoned.

This invention relates to a method of making a precast decorative panel and, more particularly, to a method of making a precast decorative panel wherein the panel is employed as a kitchen countertop, a vanity top, a tabletop or the like.

The precast decorative panel of the present invention is formed of a transparent or substantially transparent polyester resin having aggregates therein such as shells, marble chips, or the like. Thus, the aggregates, which are a filler, may be viewed through the resin.

In order that the panel may be employed as a kitchen countertop, vanity top, tabletop or the like, one of its surfaces must be flat or textured and level. A flat or textured and level surface results from resin around some of the aggregates receding therefrom during curing whereby wear will occur on the aggregates rather than the resin so as not to cause fogging of the clear or substantially clear resin due to minute scratches. If the panel has a smooth, level surface rather than a flat or textured and level surface, wear would occur on the resin to eventually cause it to become opaque due to small scratches thereon so that the aggregates could not be viewed through the resin.

One suggested method of forming a precast decorative panel of a polyester resin with aggregates therein is described in U.S. Pat. No. 3,097,080 to weir. However, when a precast decorative panel is formed using the method described in the aforesaid Weir patent, several problems arise.

When the method of the aforesaid Weir patent is employed, the complete surface, which is exposed when the plague is formed in the mold, must be ground to remove the protruding aggregates extending beyond the surface of the cured polyester resin. This large amount of grinding is both time consuming and expensive.

When the polyester resin is disposed within the mold as described in the aforesaid Weir patent with aggregates added thereto, uncontrollable distortion occurs during curing thereof after the mixture is removed from the mold. If the unexposed surface should distort rather than the exposed surface, the artificial stone plaque of Weir could not be utilized as a kitchen countertop, vanity top, tabletop, or the like because it would be necessary to grind the unexposed surface as well as the exposed surface. Grinding of both of the surfaces would result in both surfaces being smooth and level rather than the unexposed surface having a flat or textured and level surface.

Furthermore, when using the method of the aforesaid Weir patent, the quantity of material employed is substantial because of the thickness of the product. However, the thickness is necessary when the product is used as a kitchen countertop or the like to provide the desired side edge appearance.

The present invention overcomes the disadvantage of this added expense of material by forming a body of sufficient thickness for support but having only a depending flange extending from the periphery to form the drop edge with the center being hollow. This arrangement not only decreases the weight of the material but also reduces the grinding since only the surface of the flange must be ground. Thus, a substantial saving in time and expense is provided by the present invention.

In forming the product of the present invention, the polyester resin is supplied to a receptacle in the mold to the desired level. The receptacle has the shape or configuration in which the product is to be formed. The aggregates are added to the polyester resin to produce the desired thickness of the body of the product of the present invention. In order to form the flange, which extends only from the periphery of the body to form the drop edge, it is necessary to use a filler mold. The filler mold has the same configuration as the receptacle but of slightly smaller size to form a substantially uniform space between the filler mold and the receptacle so that the drop edge will be of substantially uniform thickness. The uniform space between the filler mold and the receptacle is then filled with polyester resin and aggregates to the level of the top of the receptacle.

Since the polyester resin cures at room temperature when a catalyst is added thereto, the product partially cures within approximately 30 minutes to a soft gel or rubberylike substance. If the filler mold is removed and the partially cured mixture, which forms the decorative panel, is then separated from the mold, distortion occurs in a convex direction of the surface, which would form the top surface of a kitchen countertop or the like, during the remainder of the curing cycle, which takes approximately 12 hours. Thus, it would be necessary to grind this entire top surface to produce a level surface. However, the top surface would be smooth rather than textured or flat so that wear would occur on the resin rather than the aggregates whereby the resin eventually becomes opaque. Thus, the product could not be satisfactorily used as a kitchen countertop or the like. If a satisfactory product could be produced by grinding, it also would be necessary to grind the surface of the flange, which forms the drop edge, to remove the protruding aggregates.

If the filler mold is a rigid material and is allowed to remain as a permanent stabilizer, distortion of the surface, which would form the top surface of a kitchen counter or the like, occurs in a concave direction when the mixture completes its curing in approximately 12 hours. Again, it would be necessary to grind the entire top surface to produce a level surface. Of course, the surface would be smooth rather than flat or textured, and this is not satisfactory as previously mentioned.

The use of the filler mold, either only during partial curing or as a permanent stabilizer, creates a hollow center to reduce the quantity of material used. Therefore, the expense of the material is decreased. Additionally, the amount of grinding along the bottom surface where the aggregates protrude from the polyester resin is reduced since only the flange, which forms the drop edge, must be ground. However, grinding of the top surface eliminates the textured or flat surface, which is required to provide a satisfactory product. Even if grinding of the top surface due to distortion created a satisfactory product, this extra grinding increases the cost.

The present invention eliminates distortion when a filler mold is employed by utilizing a nonrigid member, which is porous so as to not be a barrier to the flow of the resin, as a permanent stabilizer. The nonrigid and porous member may be a mat of glass fibers or an open mesh member, for example.

When the nonrigid member is employed, the filler mold is removed after partial curing and no distortion occurs during complete curing of the polyester resin. Thus, only grinding of the surface of the drop edge from which the aggregates protrude is required. Accordingly, a quantity of material is saved by having a hollow center area, and the amount of grinding is substantially reduced while still producing a flat or textured and level top surface, which is a prerequisite for a kitchen countertop, vanity top, tabletop, or the like. Since the top surface is not ground in forming the product by the method of the present invention, the resin around some of the aggregates has receded slightly to form the desired textured or flat surface wherein wear occurs on the aggregates rather than the resin. Accordingly, the resin does not become opaque as it would if the surface is ground.

An object of this invention is to provide a method for economically forming a precast decorative panel.

Other objects of this invention will be readily perceived from the following description, claims, and drawings.

This invention relates to a method of forming a precast decorative panel including including filling a receptacle in a mold with an unset thermosetting resin and aggregates to a selected level and placing a nonrigid member within the receptacle on top of the mixture of resin and aggregates. A form, which is of smaller size than the nonrigid member and of the same configuration as the receptacle but smaller size to form a substantially uniform space therebetween, is then placed on top of the nonrigid member. The uniform space between the form and the walls of the receptacle is filled with aggregates and an unset thermosetting resin. The unset resin is cured, and the form is removed after the resin has cured to at least a soft gel. The cured resin including the aggregates and the nonrigid member is separated from the mold.

This invention also relates to a method of forming a precast decorative panel having an opening therein. The method includes disposing a mold member within a receptacle in a mold with the mold member being substantially smaller than the receptacle. The portion of the receptacle not having the mold member is then filled with an unset thermosetting resin and aggregates to a selected level. At least one nonrigid member is next placed on top of the mixture of resin and aggregates except for the portion of the mixture between the mold and the adjacent walls of the receptacle. Support bars are placed in the portion of the mixture between the mold member and the adjacent walls of the receptacle. Next, a form, which is the same configuration as the receptacle but smaller size to form a substantially uniform space therebetween, is placed on top of the nonrigid member and the mold member. The uniform space between the form and the walls of the receptacle is filled with aggregates and an unset thermosetting resin. The unset resin is cured. The form and the mold member are removed from the resin after it has cured to at least a soft gel. The resin including the aggregates and the nonrigid member is separated from the mold.

The attached drawings illustrate preferred embodiments of the invention, in which:

FIG. 2 is a perspective view from another direction of a portion of the apparatus of FIG. 1 and showing the remainder of the apparatus for carrying out the method of the present invention;

FIG. 4 is a perspective view partly in section and taken from the bottom side, of the precast decorative panel formed by the mold of FIG. 3;

FIG. 6 is a perspective view, partly in section and taken from the top side, of a portion of the precast decorative panel formed by the mold of FIG. 5;

Figure 1:
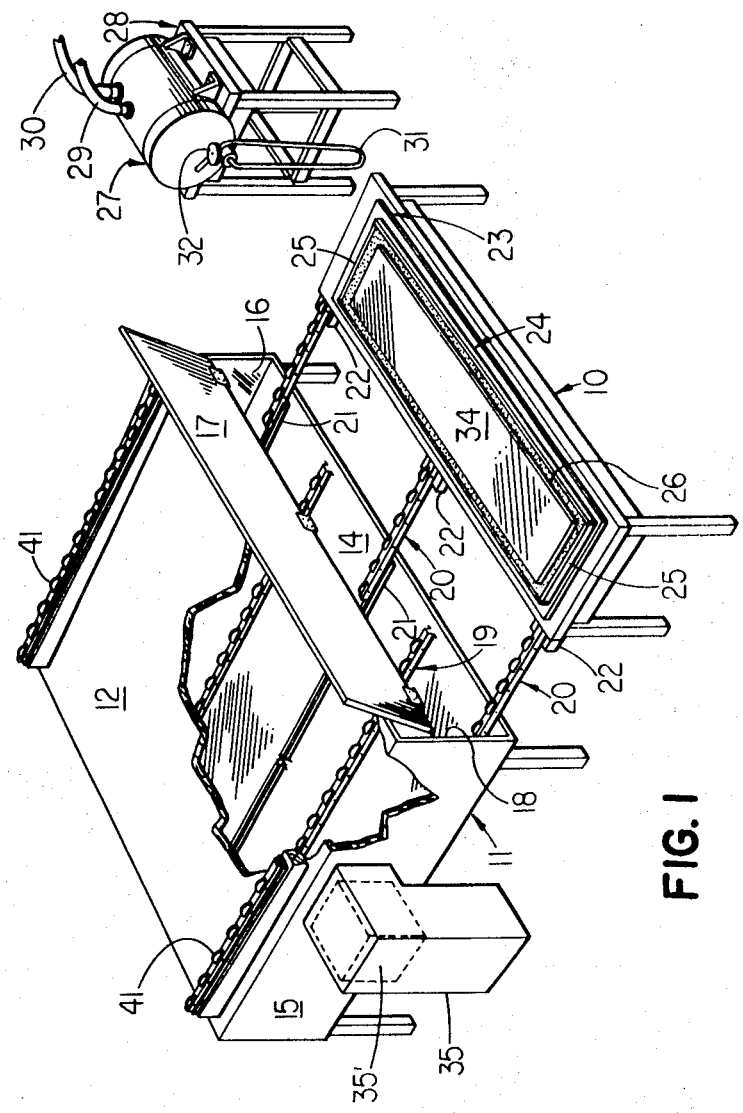
FIG. 1 is a perspective view, partly in section, illustrating a portion of the apparatus for carrying out the method of the present invention.

Referring to the drawings and particularly FIGS. 1 and 2, there is shown an apparatus for forming the product of the present invention. The apparatus includes a work or support table 10 disposed adjacent one side of a curing bin 11.

The curing bin 11 includes a top wall 12, a bottom wall 14, and end walls 15 and 16. The curing bin 11 has a pivotally mounted door 17, which closes an opening 18 in the side of the curing bin 11 adjacent the table 10.

The bottom wall 14 of the curing bin 11 is horizontally disposed to provide a level surface. Likewise, the work table 10 is positioned so that its top provides a level surface.

The bottom wall 14 of the curing bin 11 has a plurality of parallel, roller support members 19 fixed thereto and extending from one side of the curing bin 11 to the other side. The bottom wall 14 of the curing bin 11 has three parallel, movable roller support members 20 disposed adjacent the opening 18 for movement therethrough. Each of the movable roller support members 20 slides on a guide 21, which is fixed to the bottom wall 14 of the curing bin 11.

The work table 10 has three support blocks 22 extending from its side, which is adjacent the curing bin 11, to receive the ends of the movable roller support members 20 when they are extended through the opening 18. The support blocks 22 are positioned to maintain the roller support members 20 horizontal and level when they are moved from completely within the curing bin 11 to the positions in which their extended ends are supported by the blocks 22 as shown in FIG. 1.

As shown in FIG. 1, a carrier board 23, which is preferably formed of plywood, is positioned on the top of the work table 10. The carrier board 23 supports a mold 24, which is flexible and preferably formed of a high-pressure plastic laminated material.

The mold has a bottom wall and sidewalls with open ends. The open ends of the mold are closed by members 25, which are preferably formed of plywood. If desired, the end walls could be formed integral with the remainder of the mold 24 and of the same material. However, the use of the movable members 25 permits utilization of the mold 24 to form products of various sizes.

When the members 25 are disposed between the sidewalls of the mold 24, a receptacle 26 is formed therein. As shown in FIG. 1, the receptacle 26 is rectangular shaped. The walls of the receptacle 26 are coated with a suitable material such as PVA parting film, which is sold by the Sherwin-Williams Co. as Code W 65.

A mixing tank 27 is supported on top of a support table 28. The mixing tank 27 has a first conduit 29 leading to a supply tank (not shown) containing a clear or transparent or substantially clear or transparent polyester resin, which will cure at room temperature.

One example of a suitable polyester resin is the low viscosity, room temperature curing resin, which is sold under the trademark SELECTRON 5119 by Pittsburgh Plate Glass Company. The resin is the reaction product of an alpha-beta unsaturated carboxylic acid, phthalic anhydride, and a glycol. It is blended with styrene, and the composition also contains a small amount of paraffin. It should be understood that any other suitable thermosetting plastic resin, which has the properties of curing at room temperature and being clear or transparent or substantially clear or transparent may be utilized.

A second conduit 30 extends from the table 27 to a catalyst tank (not shown). When the polyester resin is SELECTRON 5119, the catalyst is preferably methyl ethyl ketone peroxide. In order to produce the desired curing, approximately 1 percent of the mixture is the methyl ethyl ketone peroxide while the remainder is SELECTRON 5119 polyester resin.

The mixing tank 27 has a flexible conduit 31 to permit the polyester resin and catalyst to be supplied from the mixing tank 27 to the receptacle 26. A knob 32 regulates a value (not shown) to control the flow from the mixing tank 27 through the conduit 31.

After the polyester resin has been added to the receptacle 26, aggregates, which may be shells, marble chips, or other similar material, are added as a filler to the polyester resin within the receptacle 26 of the mold 24. The preferred minimum size of the aggregates is No. 1 or 2, which is approximately one-fourth inch while the preferred maximum size is No. 6, which is approximately three-fourths inch. If it is desired for the end product to have a color other than the natural color of the aggregates, the aggregates are colored. The preferred level of the polyester resin and the aggregates is approximately one-half inch when using the aggregates of No. 1 or 2 size.

When it is desired for the end product to have a color other than the natural color of the aggregates, it should be understood that the resin may be tinted rather than the aggregates being colored. Thus, the resin is still transparent or substantially transparent even though it is tinted so that the aggregates within the resin may still be viewed.

Figure 3:
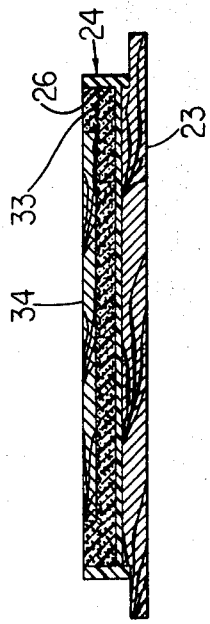
FIG. 3 is a sectional view of a mold and its support structure forming the decorative panel of the present invention in one shape.

A nonrigid member, which is porous so as to not be a barrier to the flow of the resin, is placed on top of the resin and aggregates. One suitable example of the nonrigid member is an open mesh member 33 such as a wire screen (see FIG. 3), for example. As shown in FIG. 3, the width of the open mesh member 33 is slightly less than the width of the receptacle 26. The length of the open mesh member 33 is slightly less than the length of the receptacle 26.

The size of the open mesh member 33 depends upon the amount of shrinkage of the resin, which is employed, and the size of the aggregates. When using SELECTRON 5119 polyester resin and aggregates of No. 1 or 2 size, a wire screen having a gauge of 27 and a mesh of 8 is satisfactory.

The use of the open mesh member 33 allows the resin to cure without any distortion of the product. This is because the open mesh member 33 permits less shrinkage of the resin adjacent thereto then occurs at the bottom of the receptacle 26. This is necessary because there is less resin at the bottom of the receptacle 26 due to the aggregates collecting at the bottom because of gravity. Thus, there is more resin to be cured at the top, and the open mesh member 33 compensates for this difference in quantity of resin to be cured to eliminate distortion.

It should be understood that the use of a wire screen of different gauge and/or mesh may be necessary when the width of the receptacle 26 exceeds 24 inches. Of course, if desired, the same gauge and mesh wire screen may be employed but it may be necessary to cut the open mesh member 33 along its entire length to relieve tension therein during curing; this would depend on the resin. When the open mesh member 33 is cut, the parts slightly overlap.

A filler mold or form 34, which is preferably formed of particle board, is positioned on top of the open mesh member 33. The mold 34, which is smaller than the open mesh member 33, is smaller than the receptacle 26 so that a substantially uniform space is formed between the mold 34 and the walls of the receptacle 26. This uniform space is filled with polyester resin from the mixing tank 27 and aggregates until the mixture is level with the top of the mold 24 as shown in FIG. 3.

After the receptacle 26 of the mold 24 has been completely filled, the movable roller support members 20 are disposed on the support blocks 22 so that the mold 24 may be slid from the work table 10 onto the fixed roller support members 19 within the curing bin 11. Since the top surfaces of the roller support members 20 form a continuation of the top surface of the table 10, the mold 24 is maintained level in its transportation from the work table 10 to the curing bin 11 to prevent any loss of resin from the receptacle 26.

Prior to being moved into the curing bin 11 from the work table 10 or just after entering the curing bin 11, a plurality of weights (not shown) is disposed in spaced relation to each other on top of the filler mold 34. These weights maintain the filler mold 34 in position when partial curing occurs within the curing bin 11.

The mold 24 is advanced through the curing bin 11 by other of the molds 24 being disposed on the work table 10 and filled as previously described. These molds are then advanced into the curing bin 11 to move the first of the molds 24 therethrough.

A duct 35, which communicates with the interior of the curing bin 11 through the end wall 15, has an air conditioning unit 35' disposed therein. The duct 35 connects the interior of the curing bin with the atmosphere. A thermostat (not shown) maintains the temperature of the interior of the curing bin 11 at a selected value, which is preferably 72° F.

A portion of the air which is exhausted from the curing bin 11 is returned thereto through the evaporator of the air conditioning unit 35'. The remainder of the air, which is exhausted from the curing bin 11 by the air conditioning unit 35', is directed over the condenser of the air conditioning unit 35' and then exhausted from the unit 35' to the atmosphere through the duct.

As shown in FIG. 2, the curing bin 11 has a second side opening 36, which is closed by a pivotally mounted door 37.

Three parallel, movable roller support members 38 are slidably mounted on guides 39, which are fixed to the bottom wall 14 of the curing bin 11.

When the movable roller support members 38 extend through the opening 36 with the door 37 in the position of FIG. 2, they rest on support blocks (not shown) on the side of a work or support table 40. The top of the work or support table 40 is level.

When one of the carrier boards 23 is disposed on the roller support members 38 with the mold 24 resting thereon, the movement of the roller support members 38 to the position of FIG. 2 permits the removal of the carrier board 23 and the mold 24 from the interior of the curing bin 11. Because the roller support members 38 are disposed slightly below the top of the table 40, the carrier board 23 is prevented from moving onto the top surface of the work table 40 but abuts against the side thereof. Thus, the mold 24 is easily removed from the carrier board 23 after curing has been completed within the interior of the curing bin 11. It should be understood that the weights (not shown) are removed from the filler mold 34 before removal of the carrier board 23 from the curing bin 11.

The carrier board 23 is then disposed on two parallel, roller support members 41, which are disposed on opposite ends of the top wall 12 of the curing bin 11. The support members 41 slant from the side having the opening 36 to the side having the opening 18 to allow the carrier board 23 to return toward the work table 10 by gravity.

The mold 24 is retained within the curing bin 11 for approximately 30 minutes. At the end of this time, the polyester resin has been formed into a soft gel.

Of course, the time of gelation is determined by the composition of the resin and the temperature, which is maintained within the interior of the curing bin 11. Thus, shorter gel times occur with higher temperatures, and longer gel times occur with lower temperatures. Furthermore, the percent of the catalyst also varies the amount of time. Accordingly, an increase in the percentage of the methyl ethyl ketone peroxide would reduce the time of gelation while a decrease would increase the time of gelation.

When the polyester resin with the aggregates therein becomes a soft gel, the mixture is a rubberylike substance. Since the mold 24 is preferably flexible, the mixture is easily separated therefrom in its formed configuration. It should be understood that the filler mold 34 is preferably removed from the mixture before the mixture is separated from the mold 24 but could be removed after the mold 24 is separated from the mixture or simultaneously therewith.

The empty mold 24 is then placed on top of the carrier board 23, which is resting on the roller support members 41. However, the end members 25 are withdrawn before the mold 24 is positioned on top of the carrier board 23.

The rubberylike mixture, which is rectangular in shape because this is the shape of the receptacle 26 within the mold 24, is positioned on a carrier board 42. The carrier board 42 rides on rollers 43, which are supported on a table 44.

One end of the carrier board 42 has a flexible member 45 connected thereto. The other end of the flexible member 45 is connected to weights (not shown) or other suitable means to exert a constant force on the carrier board 42 to move it along the rollers 43.

As shown in FIGS. 2 and 4, the rubberylike mixture forms a decorative panel 46 having a flange 47 extending from one side thereof around the entire periphery of the panel 46. The flange 47 will have aggregates extending through the polyester resin in the surface, which was exposed when in the mold 24. Likewise, the polyester resin may not be completely level. Therefore, it is necessary to grind the exposed surface of the flange 47.

Accordingly, the decorative panel 46 is positioned on the carrier board 42 and pulled beneath a grinding roller 48, which is driven by an electric motor 49 through a pulley 50. An exhaust duct 51 is placed above the grinding roller 48 to remove the particles, which are ground from the panel 46 by the grinding roller 48. An exhaust fan (not shown) is disposed within the duct 51 to vent the removed particles to the atmosphere.

The weights (not shown), which are attached to the flexible member 45, pull the decorative panel 46 through the roller 48 in accordance with the grinding. Thus, the carrier board 42 moves slower when either end of the decorative panel 46 is passing beneath the roller 48 because of the greater amount of required grinding due to the larger surface area.

The decorative panel 46 is removed from the carrier board 42 and allowed to harden for approximately 12 hours. At this time, it has 90 percent of its hardness and is rigid. However, the resin continues to set throughout the life of the product in the same manner as concrete does.

As previously mentioned, in forming the decorative panel 46, the resin was disposed in the mold before the aggregates were added thereto. As a result, when the aggregates pass through the resin to reach the bottom of the mold, they become coated with the resin because of the viscosity of the resin.

Thus, when the resin recedes or shrinks from around the aggregates at the surface of the decorative panel 46 during curing, the decorative panel 46 has its textured or flat surface formed by the resin being disposed beneath the upper surfaces of the aggregates between the aggregates due to the resin receding or shrinking from around these aggregates during curing.

When the decorative panel 46 (see FIG. 4) is utilized as a kitchen countertop, a vanity top, a tabletop, or the like, the panel 46 is inverted from the position of FIG. 4 to permit the unexposed surface, which is textured or flat, to be the top surface. That is, the screen 33 is on the bottom surface and the depending flange 47 extends from the bottom surface of the body of the panel 46 to form the drop edge. The screen 33 is completely hidden from view by the flange 47.

When it is desired to form a decorative panel to surround and support a kitchen sink, a range top, washbasin, or the like when the panel is employed as a kitchen countertop, a vanity top, or the like, for example, an opening must be provided within the decorative panel to receive the sink, washbasin, range top, or other structure. A portion of a decorative panel 52 having an opening 53 therein for the sink, washbasin, range top, or the like is shown in FIG. 6.

The decorative panel 52 is formed with one of the molds 24 in substantially the same manner as described with respect to the decorative panel 46. However, a mold member 54 (see FIG. 5), which is of the shape and size of the opening 53 in the decorative panel 52, is initially disposed within the receptacle 26 of the mold 24 after the mold 24 is coated with PVA parting film or the like. The mold member 54, which is preferably plywood, must be placed at the desired position within the receptacle 26 to correspond with the position of the opening 53 in the decorative panel 52.

Clear or transparent or substantially clear or transparent polyester resin and its catalyst are supplied from the mixing tank 27 to the receptacle 26 of the mold 24 after the mold member 54 is positioned within the receptacle 26. The resin and its catalyst are not supplied to the portion of the receptacle 26 having the mold member 54 therein. After the resin is supplied, the aggregates are added to the resin to form a mixture of a selected level. When the aggregates are No. 1 or 2 in size, the preferred level of the mixture of the resin and the aggregates is one-half inch.

At least one of the open mesh members 33 is disposed within the receptacle 26 on top of the mixture of the resin and aggregates. However, no open mesh member 33 fits over the mold member 54 since this area must remain open to form the opening 53 in the decorative panel 52.

If the opening 53 were at one end of the decorative panel 52, only one of the open mesh members 33 would be employed. Otherwise, two of the open mesh members are required with one disposed on each end of the mold member 54.

Figure 5:
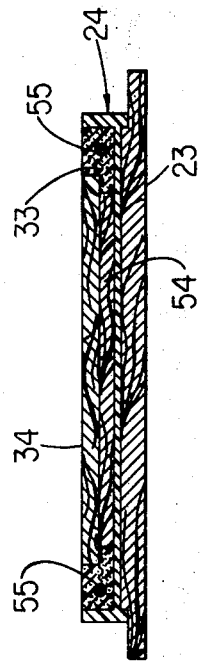
FIG. 5 is a sectional view of a mold forming a precast decorative panel of another shape.

In the same manner as employed in forming the decorative panel 46, each of the open mesh members 33 terminates short of the sidewalls of the receptacle 26 of the mold 24 as shown in FIG. 5. The open mesh members 33 also terminate short of the end walls of the receptacle 26. If the width of the receptacle 26 is greater than 24 inches, each of the open mesh members may be cut longitudinally along its entire length to relieve tension in the same manner as described in forming the decorative panel 46.

Since the open mesh members 33 cannot be disposed on top of the mold member 54, which forms the opening 53 in the decorative panel 52, strength and stability must be provided in the area of the decorative panel 52 adjacent the opening 53. Accordingly, rods 55 are disposed within the mixture of the polyester resin and the aggregates after the open mesh members 33 have been positioned. These rods are preferably three-eighths inch in diameter and formed of steel. As shown in FIG. 6, each of the rods 55 extends a greater length than the opening 53 to provide the desired stability and strength to insure that the decorative panel 52 does not distort during curing.

It should be understood that no open mesh member is disposed on top of the resin and aggregate mixture, which is within the receptacle 26 between the mold member 54 and the adjacent walls of the receptacle 26. If the mold member 54 is disposed at one end of the receptacle 26 so that only one of the open mesh members 33 is employed, the open mesh member 33 is not disposed on top of the mixture of resin and aggregates within the receptacle 26 between the mold member 54 and the adjacent end wall of the receptacle 26 and between the mold member 54 and the adjacent sidewalls of the receptacle 26. If the mold member 54 is disposed within the receptacle 26 so that one of the open mesh members 33 is disposed on each end of the mold member 54, the open mesh members 33 are not disposed on top of the mixture of the resin and the aggregates within the receptacle 26 between the mold member 54 and the adjacent sidewalls of the receptacle 26.

The filler mold 34 is then positioned within the receptacle 26 on top of the mold member 54 as shown in FIG. 5. The filler mold 34 extends over both the mold member 54 and the open mesh member 33.

As shown in FIG. 5, the filler mold 34 is smaller than the receptacle 26 and the open mesh member 33 but slightly larger than the mold member 54. The filler mold 34 cooperates with the walls of the receptacle 26 to provide a substantially uniform space therebetween.

The mixing of the resin and catalyst is supplied from the mixing tank 27 to fill the uniform space between the filler mold 34 and the walls of the receptacle 26. Aggregates also are added, preferably before the mixture of the resin and the catalyst from the mixing tank. The mixture of the aggregates and the resin is level with the top of the mold 24.

Thereafter, the mold 24 is moved from the work or support table 10 into the interior of the curing bin 11 as previously described when forming the decorative panel 46. Of course, weights are disposed on top of the filler mold 34 before curing begins in the curing bin 11.

When the mold 24 has been disposed within the curing bin 11 for approximately 30 minutes, it is removed in the same manner as described for the decorative panel 46. Thus, the movable roller support members 38 are extended to the position of FIG. 2, and the carrier board 23 is prevented from moving onto the top surface of the table 40. Of course, the weights are removed before the mold 24 is removed from the curing bin 11.

After the mold 24 is disposed on the table 40, the decorative panel 52, which is now in a soft gel or rubberylike state, is separated from the mold 24 by flexing the mold 24. The filler mold 34 and the mold member 54 are then removed from the decorative panel 52. The carrier board 23 is disposed on top of the roller support members 41 and the empty mold 24 is then placed on top of the carrier board 23.

The decorative panel 52 is then placed on the carrier board 42, which rides on the rollers 43, with the decorative panel 52 having its top surface 56 resting on the carrier board 42 and its bottom surface on top. In this manner, as previously described for the decorative panel 46, the protruding aggregates are removed by the grinding roller 48 as the decorative panel 52 passes therebeneath due to the constant force exerted on the carrier board 42 through the flexible member 45.

As shown in FIG. 6, the decorative panel 52 has a depending flange 57 in the same manner as the decorative panel 46 so that there is a substantially hollow center. The flange 57, which extends around the entire periphery of the body of the decorative panel 52, functions as a drop edge extending downwardly from the body.

As shown in FIG. 6, the drop edge 57 prevents the open mesh members 33 from being visible when the decorative panel 52 is installed as a kitchen countertop or the like. The top surface of the decorative panel 52 is textured or flat to prevent the resin from becoming opaque due to wear.

While the receptacle 26 has been shown and described as having a rectangular shape, it should be understood that it could be of any other shape depending on the desired configuration of the decorative panel to be formed therein. For example, the receptacle 26 could have a circular or oval configuration. Likewise, the opening 53 of the panel 52 could be other than rectangular shaped. The mold member 54 would have the desired configuration of the opening 53.

Figure 7:
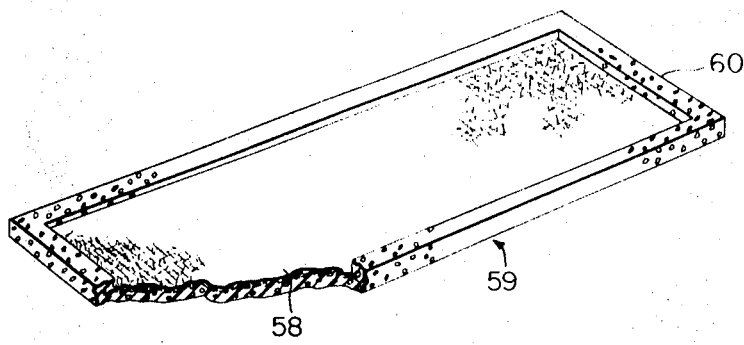
FIG. 7 is a perspective view, partly in section and taken from the bottom side, of another form of a precast decorative panel formed by the mold of FIG. 3.

While the nonrigid member in the decorative panel 46 and in the decorative panel 52 has been shown and described as the open mesh member 33, the nonrigid member could be formed of a mat 58 (see FIGS. 7 and 8) of glass fibers. The mat 58 has the required characteristics or properties of being nonrigid and capable of permitting the resin to pass therethrough so as not to be a barrier to the flow of the resin.

One suitable example of the mat 58 is a mat of chopped glass strands sold under the trademark UNIFORMAT by Ferro Corporation. This has a weight of 1½ ounces per square foot.

All of the steps, which have previously been described for forming the panel 46 when utilizing the open mesh member 33 as the nonrigid member, would be utilized to form a decorative panel 59, which is the same as the panel 46 except that the open mesh member 33 is replaced by the mat 58. Accordingly, the various steps in forming the decorative panel 59 will not be described.

Figure 8:
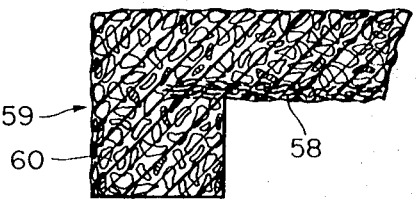
FIG. 8 is an enlarged sectional view of a portion of the panel of FIG. 7.

As shown in FIG. 8, the panel 59 has its top surface flat or textured due to the receding of the resin around some of the aggregates in the same manner as the panels 46 and 52. Likewise, as shown in FIG. 8, the outer surface of flange 60, which forms the drop edge, is flat or textured in the same manner as the outer surfaces of the flanges 47 and 57 of the panels 46 and 52, respectively.

Figure 9:
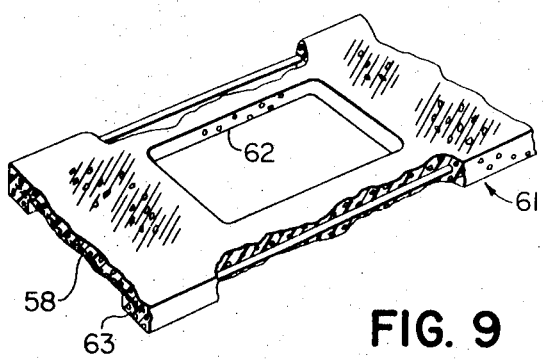
FIG. 9 is a perspective view, partly in section and taken from the top side, of a portion of another embodiment of a precast decorative panel formed by the mold of FIG. 5.

As shown in FIG. 9, a decorative panel 61 is formed for use as a kitchen countertop, a vanity top, or the like, for example, when an opening 62 must be provided within the decorative panel to surround and support a kitchen sink, a range top, a washbasin, or other similar structure. Thus, the decorative panel 61 is similar to the decorative panel 52 except that the nonrigid member of the panel 61 is the mat 58 of glass fibers rather than the open mesh member 33.

The formation of the decorative panel 61 is exactly the same as utilized in forming the panel 52 except that the open mesh member 33 is replaced by the mat 58 of glass fibers. Accordingly, the various steps in forming the panel 61 will not be described. The panel 61 has both its top surface and the outer surface of its flange 63 textured or flat in the same manner as shown in FIG. 8 for the panel 59.

An advantage of this invention is that it reduces the weight of a finished product formed of polyester resin and aggregates. Another advantage of this invention is that it decreases the cost. A further advantage of this invention is that the amount of required grinding to provide a smooth surface finish is substantially reduced. Still another advantage of this invention is that the panel remains clear or transparent or substantially clear or transparent irrespective of the wear on the top surface.

For purposes of exemplification, particular embodiments of the invention has been shown and described according to the best present understanding thereof. However, it will be apparent that changes and modifications in the arrangement and construction of the parts thereof may be resorted to without departing from the spirit and scope of the invention

I claim:

1. A method of forming a precast decorative panel including filling a receptacle in a mold with an unset thermosetting resin and aggregates to a selected level, placing a nonrigid porous member within the receptacle on top of the mixture of resin and aggregates, placing a form on top of the nonrigid member of smaller size than the nonrigid member and of the same configuration as the receptacle but smaller size to form a substantially uniform space therebetween, filling the uniform space between the form and the walls of the receptacle with aggregates and an unset thermosetting resin, curing the unset resin, removing the form after sufficient curing of the resin has occurred to produce at least a soft gel, and separating the resin including the aggregates and the nonrigid member from the mold after sufficient curing of the resin has occurred to produce at least a soft gel.

2. The method according to claim 1 in which the mold is flexible.

3. The method according to claim 1 in which the nonrigid member is an open mesh member.

4. The method according to claim 1 in which the nonrigid member is a mat of glass fibers.

5. The method according to claim 1 in which the unset resin is cured for approximately 30 minutes at a constant temperature to a soft gel and the form is removed after the resin is cured for approximately 30 minutes to a soft gel.

6. The method according to claim 5 in which the constant temperature is approximately 72° F.

7. The method according to claim 1 in which the thermosetting resin is a polyester resin.

8. The method according to claim 1 including polish grinding the aggregates extending beyond the resin after the resin is partially cured to a soft gel.

9. The method according to claim 6 including polish grinding the aggregates extending beyond the resin after the resin is cured for approximately 30 minutes to a soft gel.

10. The method according to claim 1 in which the nonrigid member is of a slightly smaller size than the receptacle.

11. The method according to claim 1 in which the resin is substantially transparent.

12. A method of forming a precast decorative panel having an opening therein including providing a receptacle with sidewalls and end walls, disposing a mold member within the receptacle in a mold with the mold member being substantially smaller than the receptacle, filling the portion of the receptacle not having the mold member with an unset thermosetting resin and aggregates to a selected level, placing at least one nonrigid porous member on top of the mixture of resin and aggregates except for the portion of the mixture between the mold member and the adjacent sidewalls of the receptacle, placing support bars in the portion of the mixture between the mold member and the adjacent sidewalls of the receptacle, placing a form of the same configuration as the receptacle but smaller size to form a substantially uniform space therebetween on top of the nonrigid porous member and the mold member, filling the uniform space between the form and the walls of the receptacle with aggregates and an unset thermosetting resin, curing the unset resin, removing the form and the mold member after sufficient curing of the resin has occurred to produce at least a soft gel, and separating the resin including the aggregates and the nonrigid member from the mold.

13. The method according to claim 12 in which the mold is flexible.

14. The method according to claim 12 in which the support bars are formed of steel or the like.

15. The method according to claim 12 in which the unset resin is cured for approximately 30 minutes at a constant temperature to a soft gel and the form and the mold member are removed after the resin is cured for approximately 30 minutes to a soft gel.

16. The method according to claim 15 in which the constant temperature is approximately 72° F.

17. The method according to claim 12 in which the thermosetting resin is a polyester resin.

18. The method according to claim 12 including polish grinding the aggregates extending beyond the resin after the resin is partially cured to a soft gel.

19. The method according to claim 16 including polish grinding the aggregates extending beyond the resin after the resin is cured for approximately 30 minutes to a soft gel.

20. The method according to claim 12 in which the nonrigid member is an open mesh member.

21. The method according to claim 12 in which the nonrigid member is a mat of glass fibers.

22. The method according to claim 12 in which the resin is substantially transparent.

UNITED STATES PATENT OFFICE
CERTIFICATE OF CORRECTION

Patent No. 3,608,038                    Dated September 21, 1971

Inventor(s) Frank R. Smith

It is certified that error appears in the above-identified patent and that said Letters Patent are hereby corrected as shown below:

Column 1, line 12, "countertop" should read -- counter top -- ; line 12, "tabletop" should read -- table top -- ; line 19, "tertop" should read -- ter top --, "tabletop" should read -- table top -- and a comma should be inserted after "tabletop"; line 32, "weir" should read -- Weir -- ; line 47, "countertop" should read -- counter top -- , "tabletop" should be -- table top -- ; line 56, "countertop" should read -- counter top -- . Column 2, line 9, "rubberylike" should read -- rubbery-like -- ; line 14, "countertop" should read -- counter top -- ; line 21, cancel the "hyphen (-)"; line 59, "countertop" should read -- counter top -- ; line 59, "tabletop" should read -- table top -- ; line 71, cancel the second occurrence of "including". Column 3, line 43, after "view" insert a comma. Column 4, line 17, cancel the hyphen "(-)"; line 19, after "mold" insert -- 24 -- ; line 19, "sidewalls" should read -- side walls -- ; line 26, "sidewalls" should read -- side walls -- ; line 55, "value" should read -- valve -- . Column 5, line 17, "then" should read -- than -- . Column 6, lines 42, 54 and 63, "rubberylike" should read -- rubbery-like -- , each occurrence. Column 7, lines 30 and 39, "countertop" should read -- counter top -- , each occurrence; line 30, "tabletop" should read -- table top -- ; lines 38, 41, and 43, "washbasin" should read -- wash basin -- ; line 45, "with" should be -- within -- . Column 8, lines 3, 31, and 37, each occurrence, "sidewalls" should read -- side walls -- ; line 68, "rubberylike" should read -- rubbery-like -- . Column 9, lines 15 and 53, "countertop" each occurrence, should read -- counter top -- ; line 56, "washbasin" should read -- wash basin -- . Column 10, line 6 after "invention" insert a period; lines 50, 57 and 59, "sidewalls" should read -- side walls -- , each occurrence.

Signed and sealed this 24th day of October 1972.

(SEAL)
Attest:

EDWARD M. FLETCHER, JR.
Attesting Officer

ROBERT GOTTSCHALK
Commissioner of Patents